Feb. 25, 1936.  G. W. GODSEY  2,031,829
BRAKE LOCK
Filed May 8, 1934
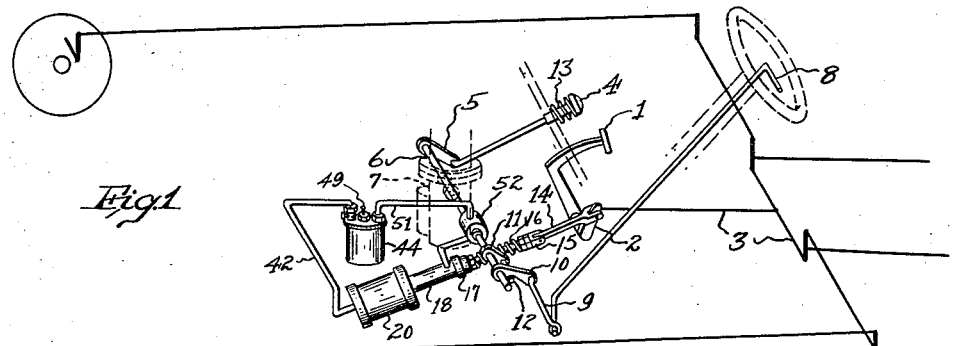
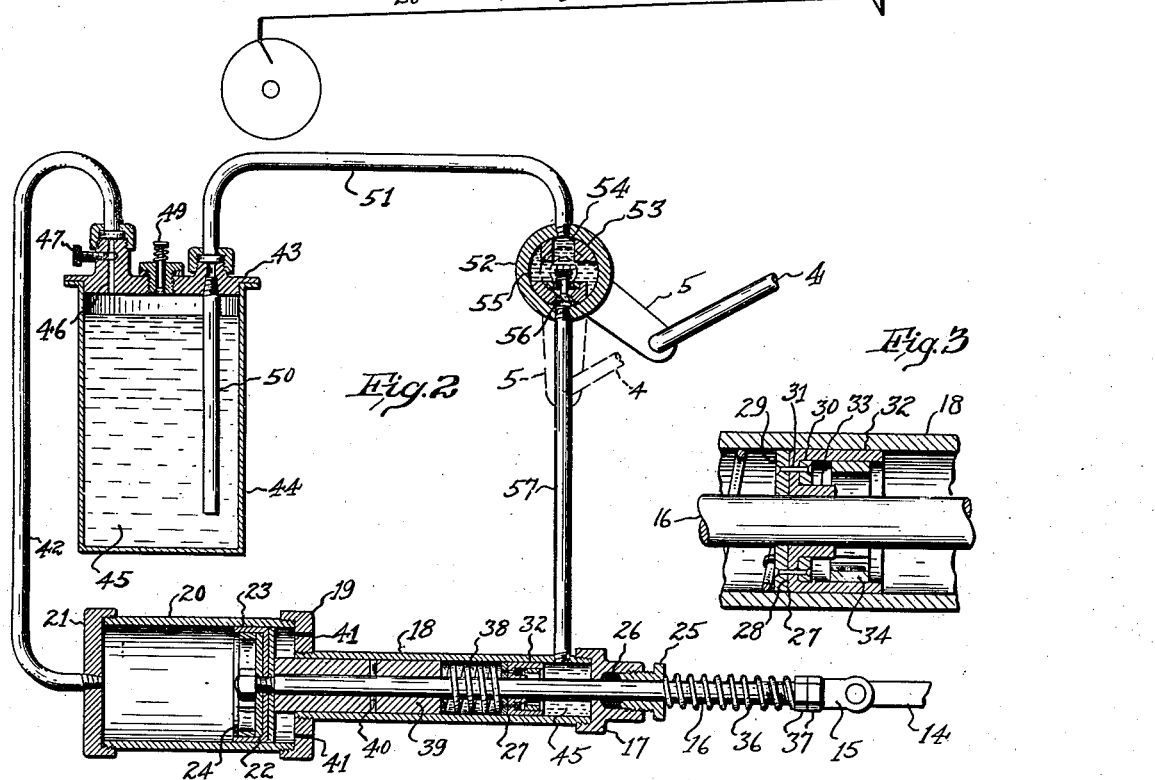
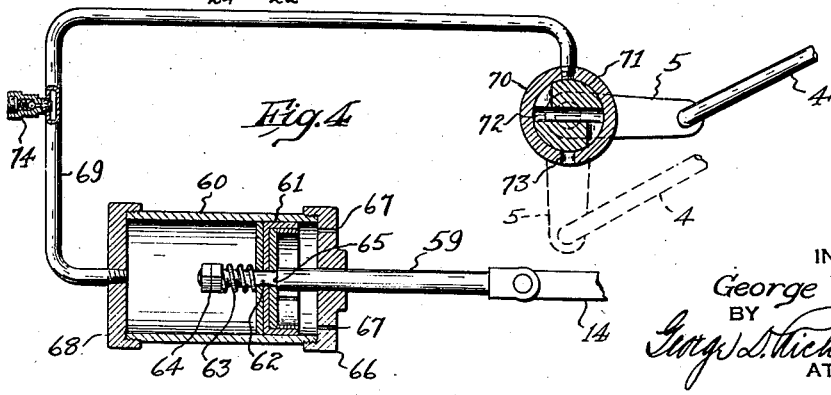
INVENTOR
George W. Godsey,
BY
ATTORNEY Patented Feb. 25, 1936

2,031,829

UNITED STATES PATENT OFFICE 2,031,829

BRAKE LOCK

George W. Godsey, Elizabeth, N. J.

Application May 8, 1934, Serial No. 724,498

7 Claims. (Cl. 192—3)

This invention relates generally, to motor vehicles, and the invention has reference, more particularly, to a novel brake lock or device adapted to be applied as an accessory to vehicle braking systems and serving to retain the vehicle brakes in applied condition during such periods, as when temporarily stopping on a hill, where it is not convenient or even possible to manually hold the brakes in applied condition.

It is well known that considerable difficulty is experienced by drivers, temporarily stopping on the sides of hills or grades, as when stopping for stop lights, to again proceed without tending to slide back, thereby annoying the drivers behind, or stalling the engines of their vehicles. This is because the vehicle starts to slide back when the driver takes his right foot off of the brake pedal in order to apply the accelerator, so that by the time the engine starts to pick up the vehicle may have traveled several feet rearwardly, thereby tending to cause collisions and annoyance. Also, the sudden excessive load thus applied by a rearwardly moving vehicle to its engine is apt to stall the latter, causing further difficulties. Some drivers, when stopping temporarily on the side of a hill, keep their right foot on the brake pedal and when they desire to start ahead, they give the engine gas with the hand accelerator while simultaneously removing their foot from the brake pedal. This operation requires skill, for unless the hand and foot motions are properly synchronized, the engine will be stalled.

The principal object of the present invention is to provide a novel brake lock that is adapted to automatically lock or hold the brakes applied after the driver depresses or applies the brake pedal for a predetermined period, the driver having previously allowed the accelerator to move to idling position, the said brake lock, by holding the brakes applied, enables the driver to remove his foot from the brake pedal and operate the accelerator at any time thereafter, the depressing or movement of the accelerator from idling position serving to automatically release the brake lock, thereby disengaging the brakes in synchronism with the pick up of the engine.

Another object of the present invention lies in the provision of a novel brake lock of the above character that utilizes compressible or pneumatic fluid for initiating the operation of the lock and for creating the desired time lag between the manual application of the brakes and the operation of the lock, and which utilizes incompressible or hydraulic fluid for providing a safe and sure holding medium for retaining the lock in applied condition as long as desired, the said brake lock having automatic means for correcting for any leakage of the operating fluids, and for preventing accidental release of the lock.

Still another object of the present invention is to provide a novel brake lock of the above character that is of simple, rugged construction and is reliable and positive in use.

Other objects of this invention, not at this time more particularly enumerated, will be clearly understood from the following detailed description of the same.

The invention is clearly illustrated in the accompanying drawing, in which:

Fig. 1 is a schematic, perspective view of the braking system of a motor vehicle having the novel brake lock of this invention applied thereto.

Fig. 2 is an enlarged fragmentary sectional view showing the novel brake lock in detail.

Fig. 3 is an enlarged fragmentary view of a part of the structure shown in Fig. 2, and Fig. 4 is a view similar to Fig. 2 but of a modified form of the invention.

Similar characters of reference are employed in said views, to indicate corresponding parts.

Referring now to Figs. 1 to 3 of the said drawing, the reference numeral 1 designates the brake pedal of a motor vehicle, the said brake pedal having an arm 2 below the floor board connected to the schematically shown vehicle brake system 3. The foot accelerator 4 of the vehicle is shown connected to a lever 5 fixed on the throttle valve shaft 6 of the vehicle carburetor 7. The hand accelerator 8 is shown connected by a link 9 to a lever 10 pivoted on throttle valve shaft 6. A lever 11 is fixed on shaft 6 and carries a pin 12 underlying lever 10. By turning hand accelerator 8 downwardly (assuming the foot accelerator 4 is in idling position) the link 9 and lever 10 are moved downwardly, thereby causing the latter to depress pin 12 resulting in turning throttle valve shaft 6 to open the throttle valve. When hand throttle 8 is returned to its upper idling position, spring 13 on the foot throttle serves to return the throttle valve shaft 6 to idling position.

According to the preferred arrangement, the brake pedal arm 2 is connected by a link 14 and yoke 15 to the outer end of a piston rod 16. This piston rod extends through a conforming, axial aperture provided in the head 17 that is fixed, as by threading, upon one end of a hydraulic cylinder 18. The outer end of cylinder 18 is threaded into a central aperture provided in one head or end 19 of a larger pneumatic cylinder 20. The other end of cylinder 20 is closed by a head 21.

Piston rod 16 extends throughout the length of cylinder 18 and projects into cylinder 20, the inner end of this piston rod having a piston 22 fixed thereon. Piston 22 is illustrated as comprising a cup leather 23 confined between metal washers. A split ring 24 is shown pressing the cup leather 23 outwardly and into snug engagement with the inner surface of cylinder 20. A stuffing gland 25 is shown threaded into head 17 for pressing packing 26 against the piston rod 16, thereby preventing outward leakage of liquid from within cylinder 18. A coil compression spring 36 surrounds piston rod 16 externally of cylinder 18 and bears at one end against gland 25 and at its other end against nuts 37 that are adjustable along piston rod 16.

A piston 27 (see Figs. 2 and 3) is contained within hydraulic cylinder 18 and is slidable along piston rod 16. This piston 27 consists of a flexible washer or cup leather 28 that is gripped between metal washers 29 and 30 by means of rivets 31, the said flexible washer 28 having annular portions 32 and 33 engaging the cylinder 18 and piston rod 16, respectively. A split ring 34 is shown pressing the annular portion 32 against the inner surface of the cylinder 18. The split ring 34 and the split ring 24 may be omitted, if desired, but their presence assists in the prevention of leakage past the pistons 22 and 27. A compression spring 38 is contained within cylinder 18 and bears at one end against piston 27 and at its other end against a collar 39 fixed as by a pin 40 on piston rod 16.

The cylinder head 19 is provided with air vents 41, whereas the cylinder head 21 has one end of a pipe 42 threaded thereinto and communicating with the interior of cylinder 20. The other end of pipe 42 is connected to the cover 43 of a liquid reservoir 44 that is adapted to contain liquid 45 such as oil. A restricted passage 46 is provided in cover 43 and connects pipe 42 to the interior of reservoir 44. A thumb screw 47 is shown threaded into cover 43 and is adapted to determine the effective area of passage 46 and hence determines the rate at which air can flow from cylinder 20 and into reservoir 44 as will further appear. An inwardly opening, spring pressed check valve 49 is provided in cover 43. If desired, this check valve 49 may be provided on the cylinder head 21 instead of in cover 43.

A pipe 50 is contained within reservoir 44, the said pipe being threaded at its upper end into cover 43 and having its lower end terminating near the bottom of reservoir 44. Pipe 50 communicates with a pipe 51 that is connected to a valve casing 52 having a valve 53 turnable therewithin. Valve 53 has cross passages 54 and 55 therein, passage 54 being provided with a spring pressed check valve 56 while passage 55 is unobstructed. Valve 53 is connected to and is operated by throttle valve shaft 6, as especially shown in Fig. 1. A pipe 57 connects with casing 52 diametrically opposite to the point of connection of pipe 51 to this casing. Pipe 57 is also connected to cylinder 18 adjacent head 17. Pipes 51 and 57, valve 53 and the space within cylinder 18 between piston 27 and head 17 are ordinarily filled with the liquid or oil 45.

In use, assuming that the operator of the vehicle has driven onto the side of a hill and is compelled to stop temporarily as for a stop sign or on account of traffic conditions. He takes his foot off of the foot accelerator 4, thereby enabling the same to move outwardly into its idling position shown in Fig. 1. The outward movement of the accelerator 4 causes lever 5 to swing upwardly into the position shown in Fig. 1 or to the full line position shown in Fig. 2, in which position the valve 53 is caused to assume the position shown in Fig. 2. In this position of valve 53, the passage 54 interconnects pipes 51 and 57.

The operator now depresses the brake pedal 1, thereby applying the vehicle brakes through actuation of the brake system 3. In applying the brakes, the operator simultaneously moves the link 14 forwardly, thereby forcing piston rod 16 inwardly of cylinder 18 while compressing spring 36. The inward movement of piston rod 16 causes piston 22 to compress the air in pneumatic cylinder 20, thereby forcing this air out through pipe 42 and into the top of reservoir 44. Owing to the presence of the restricted passage 46 in reservoir cover 43, the speed at which the air can enter reservoir 44 is limited and consequently an appreciable period of time elapses between the application of the brakes and the flow of air into reservoir 44.

The air entering reservoir 44 serves to depress the liquid or oil level therein, thereby forcing oil 45 upwardly within pipe 50, through pipe 51, into valve passage 54 past check valve 56, through pipe 57 and into hydraulic cylinder 18. This oil, being under pressure, serves to move piston 27 to the left as viewed in Fig. 2, thereby causing this piston to follow up the movement of collar 39 attached to piston rod 16. Continued flow of compressed air into the top of reservoir 44 causes the oil 45 to compress spring 38 somewhat between collar 39 and piston 27. This will be readily understood when it is noted that pneumatic cylinder 20 is considerably larger in diameter than cylinder 18, so that for a definite displacement of piston 22 the volume of air compressed or moved is considerably greater than the amount of oil flowing into the hydraulic cylinder 18, so that the pressure built up in the system causes the oil or liquid 45 to force piston 27 toward the collar 39 thereby compressing spring 38.

The operator may now remove his foot from the brake pedal 1 but the brake pedal remains depressed and the brakes remain applied owing to the holding action of the brake lock. This holding action of the brake lock is due to the presence of the oil 45 in hydraulic cylinder 18. This oil cannot escape from this cylinder since check valve 56 prevents reverse flow of the oil. Consequently piston 27 acting through spring 38 and collar 39 serves to retain piston rod 16 in its inner position, thereby retaining the brakes in applied condition.

The brakes remain applied regardless of how long the operator is waiting on the hill owing to the incompressibility of the oil in cylinder 18. In fact, the device of this invention may be used in lieu of the parking brake when parking on the side of a hill. Should any oil tend to leak past piston 27 or past packing 26 or the check valve 56, the compressed spring 38 will automatically expand sufficiently to automatically correct for this loss of oil without materially decreasing the hydraulic pressure in the system, whereby the pressure of spring 38 upon collar 39 remains nearly constant so that the brake remains applied.

As soon as it is desired to again start forward, the operator is free to depress the foot accelerator 4, thereby opening the carburetor throttle valve causing the engine to pick up while simultaneously turning valve 53 so that open passage 55 interconnects pipes 51 and 57, thereby allowing the oil to flow freely out of hydraulic cylinder 18 under the action of spring 36 and the brake system spring and releasing the brakes. Spring 36 acting jointly with the brake system spring serves to quickly return piston 22 to the position shown in Fig. 2, valve 49 serving to prevent suction at the rear of piston 22. Thus, the opening of the throttle valve causes the simultaneous release of the brakes so that the vehicle starts forward without rolling back or stalling.

Owing to the use of the restricted passage 46 in conjunction with the pneumatic-hydraulic system of this invention, a definite period of time elapses between the application of the brakes by means of foot pedal 1 and the operation of the brake lock. This is highly desirable because many times in traffic or when making turns, the vehicle operator will depress the foot brake pedal 1 momentarily to slow up the vehicle with no intention or desire of having the brakes permanently applied by the brake lock. Consequently these short applications of the brake will not operate the brake lock. However, when it is desired to bring the vehicle to a dead stop, i. e. when the brake is applied for several seconds, sufficient air enters the reservoir 44 to cause the operation of the brake lock as desired. It will be noted that with the vehicle brought to a complete stop, the brake lock operates to hold the brakes applied, thereby enabling the operator to remove his foot from the brake without danger of the vehicle moving. The use of adjusting screw 47 enables the time period required for the operation of the lock to be varied at will.

In the form of the invention shown in Fig. 4, the link 14 is connected to a piston rod 59 extending into a pneumatic cylinder 60 and having a piston 61 movable within limits on a reduced end portion 62 thereof, which piston is similar in construction to piston 22 though turned in the reverse direction. A coil compression spring 63 surrounds end portion 62 of the piston rod and bears at one end against nuts 64 and at its other end against piston 61 thereby normally holding this piston in engagement with a shoulder 65.

One head 66 of cylinder 60 is provided with vents 67 while the other head 68 thereof is connected by a pipe 69 to a valve casing 70 having a valve 71 turnable therein. Valve 71 has a passage 72 therethrough. Valve casing 70 has a port 73 opposite the point of connection of pipe 69. An outwardly opening relief valve 74 is threaded into pipe 69.

In operation, with the throttle valve in idling position, the foot accelerator and arm 5 are in the full line position shown in Fig. 4, and the valve 71 closes the end of pipe 69. If now the foot brake is applied, the piston rod 59 is moved inwardly of cylinder 60 causing piston 61 to force air out of pipe 69 and relief valve 72. Upon the release of the foot brake piston rod 59 moves outwardly somewhat compressing spring 63 and thereafter slight rearward movement of piston 61 causes suction to be immediately created in advance of piston 61, i. e. between piston 61 and head 68 and prevents this piston from moving back to its original position shown in Fig. 4 and hence the brakes are held applied.

Any leakage of air past piston 61 is in part compensated for by the automatic expansion of spring 63. Upon depressing the foot accelerator 4 the passage 72 connects pipe 69 with port 73 thereby allowing air to enter cylinder 60 and permitting the brake to release simultaneously with the pick-up of the engine.

It will be noted that the brake lock may be controlled from either the foot or hand accelerator.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:

1. In a device of the character described for locking the brakes of gas engine vehicles, in combination with the engine throttle, cylinder means, a piston movable within said cylinder means and connected to the vehicle brakes, a valve operated entirely in response to the operation of the engine throttle, and fluid conducting means interconnecting said cylinder means and said valve, whereby the application of the vehicle brakes when the engine throttle is in one position causes said piston to move and effect the retention of the vehicle brakes in applied condition, whereas the movement of the engine throttle to another position initiates reverse movement of said piston, thereby effecting the release of the vehicle brakes.

2. In a device of the character described for locking the brakes of gas engine vehicles, in combination with the engine throttle, a pneumatic cylinder, a piston movable within said cylinder and connected to the vehicle brakes, a valve operated entirely in response to the operation of the engine throttle, and fluid conducting means having check valve means therein interconnecting said pneumatic cylinder with said valve, whereby the application of the vehicle brakes when the engine throttle is in idling position causes said piston to move and effect the retention of the vehicle brakes in applied condition, whereas the movement of the engine throttle to driving position initiates reverse movement of said piston, thereby effecting the release of the vehicle brakes.

3. In a device of the character described for locking the brakes of gas engine vehicles, in combination with the engine throttle, a pneumatic cylinder, a hydraulic cylinder arranged in tandem with said pneumatic cylinder, pistons movable within said pneumatic and hydraulic cylinders and connected to the vehicle brakes, a valve responsive to the operation of the engine throttle, and fluid conducting means interconnecting said pneumatic and hydraulic cylinders to said valve, whereby the application of the vehicle brakes when the engine throttle is in one position causes said pistons to move and effect the retention of the vehicle brakes in applied condition, whereas the movement of the engine throttle to another position initiates reverse movement of said pistons, thereby effecting the release of the vehicle brakes.

4. In a device of the character described for locking the brakes of gas engine vehicles, in combination with the engine throttle, a pneumatic cylinder, a hydraulic cylinder arranged in tandem with said pneumatic cylinder, pistons movable within said pneumatic and hydraulic cylinders and connected to the vehicle brakes, a valve responsive to the operation of the engine throttle, and fluid conducting means interconnecting said pneumatic and hydraulic cylinders to said valve, said fluid conducting means including a fluid reservoir interposed between said pneumatic cylinder and said valve, whereby the application of the vehicle brakes when the engine throttle is in idling position causes said pneumatic cylinder piston to force fluid into said reservoir, thereby driving fluid within said reservoir therefrom and through said valve and into said hydraulic cylinder, said valve serving to prevent reverse flow of fluid from said hydraulic cylinder, the fluid thus confined within said hydraulic cylinder serving to prevent reverse movement of said hydraulic cylinder piston so that the vehicle brakes are retained in applied condition, the movement of the engine throttle to driving position actuating said valve to enable fluid to flow from said hydraulic cylinder, thereby enabling reverse movement of said hydraulic cylinder piston to effect the release of the brakes.

5. In a device of the character described for locking the brakes of gas engine vehicles, in combination with the engine throttle, a pneumatic cylinder, a hydraulic cylinder arranged in tandem with said pneumatic cylinder, a piston rod connected to the vehicle brakes and extending through said hydraulic cylinder and into said pneumatic cylinder, a piston fixed on said piston rod within said pneumatic cylinder, a second piston on said piston rod within said hydraulic cylinder, a liquid reservoir, piping connecting said pneumatic cylinder to said reservoir, a valve operated from the engine throttle, piping connecting said reservoir to said valve and additional piping connecting said valve to said hydraulic cylinder, the application of the vehicle brakes when the engine throttle is in idling position causing said piston rod and said pneumatic cylinder piston to move and force air into said reservoir, thereby displacing liquid therefrom and through said valve into said hydraulic cylinder, said valve serving to prevent reverse flow of the liquid, whereby such liquid within said hydraulic cylinder, by pressing against said second piston, serves to retain the brakes in applied condition, the movement of the engine throttle to running position serving to operate said valve to enable liquid to flow out of said hydraulic cylinder back into said reservoir, thereby effecting the release of the vehicle brakes.

6. In a device of the character described for locking the brakes of gas engine vehicles, in combination with the engine throttle, a pneumatic cylinder, a hydraulic cylinder arranged in tandem with said pneumatic cylinder, a piston rod connected to the vehicle brakes and extending through said hydraulic cylinder and into said pneumatic cylinder, a piston fixed on said piston rod within said pneumatic cylinder, a second piston on said piston rod within said hydraulic cylinder, said second piston being slidable within limits on said piston rod, spring means interposed between said second piston and an abutment on said piston rod, a liquid reservoir, piping connecting said pneumatic cylinder to said reservoir, a valve operated from the engine throttle, piping connecting said reservoir to said valve and additional piping connecting said valve to said hydraulic cylinder, the application of the vehicle brakes when the engine throttle is in idling position causing said piston rod and said pneumatic cylinder piston to move and force air into said reservoir, thereby displacing liquid therefrom and through said valve into said hydraulic cylinder, said valve serving to prevent reverse flow of the liquid, whereby such liquid within said hydraulic cylinders, by pressing against said second piston, serves to retain the brakes in applied condition, any leakage of liquid from said hydraulic reservoir being automatically compensated for by the expansion of said spring means, the movement of the engine throttle to running position serving to operate said valve to enable liquid to flow out of said hydraulic cylinder back into said reservoir, thereby effecting the release of the vehicle brakes.

7. In a device of the character described for locking the brakes of gas engine vehicles, in combination with the engine throttle, a pneumatic cylinder having a piston therein connected to the vehicle brakes, a liquid reservoir having a restricted passage communicating with said pneumatic cylinder, a valve operated from the engine throttle, a hydraulic cylinder having a piston therein connected to the vehicle brakes, said valve being connected to said reservoir and to said hydraulic cylinder whereby the application of the vehicle brakes when the throttle is in idling position causes air to be driven from said pneumatic cylinder through said restricted passage and into said reservoir, displacing liquid from the latter through said valve and into said hydraulic cylinder, thereby effecting the locking of the vehicle brakes, said restricted passage delaying the movement of air into said reservoir, whereby a predetermined time elapses between the application of the brakes and the operation of the locking device to lock the brakes.

GEORGE W. GODSEY.